March 19, 1963  L. WALLERSTEIN, JR  3,081,993
RESILIENT MOUNTING
Filed Dec. 12, 1960

INVENTOR.
Leon Wallerstein Jr
BY
Ralph Hammar
Attorney

United States Patent Office 3,081,993
Patented Mar. 19, 1963

3,081,993
RESILIENT MOUNTING
Leon Wallerstein, Jr., Erie, Pa., assignor to Lord Manufacturing Company, Erie, Pa., a corporation of Pennsylvania
Filed Dec. 12, 1960, Ser. No. 75,253
9 Claims. (Cl. 267—33)

In resilient mountings in which the load is carried by an elastomeric body in compression, the body bulges under load and the load deflection curve starts with a relatively soft spring rate which becomes increasingly stiffer as the load increases. In order that the spring rate at rated load may be sufficiently soft for cushioning vibrations, a considerable deflection takes place under static load.

This invention is intended to modify the characteristics of the compression loaded mountings by a spring band around the elastomeric body. At light loads, the band acts as a rigid member confining the elastomer so that initially the mounting has a stiff spring rate. As the load increases on the band, it yields and the spring rate decreases. It is accordingly possible to have a mounting which is stiff at light loads and yet is as soft at rated load as a conventional unbanded compression loaded mounting. Among the advantages are reduction in the static deflection under rated load and increase in the energy absorption characteristics under shock.

Figure 1:
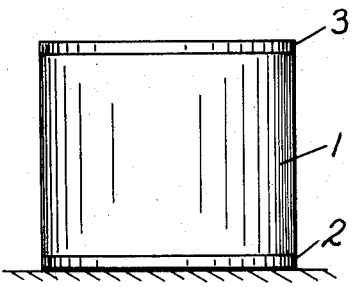
Figure 3:
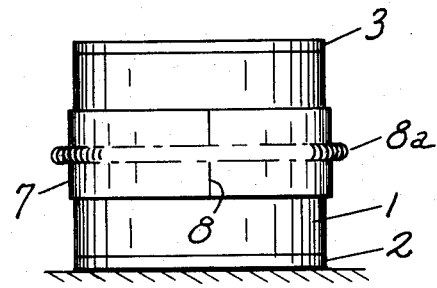
Figure 2:
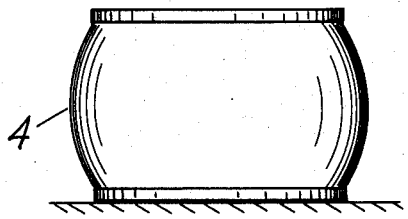
Figure 4:
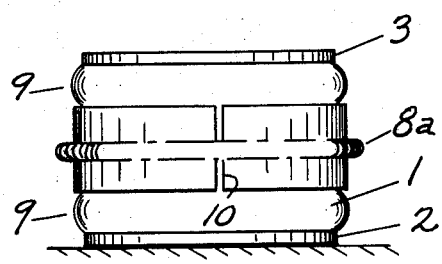
Figure 5:
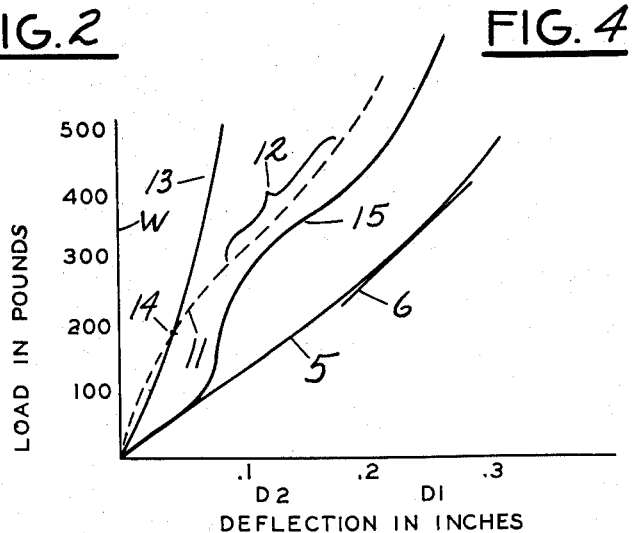

In the accompanying drawing, FIG. 1 shows a conventional compression loaded mounting under no load, FIG. 2 shows the FIG. 1 mounting under load, FIG. 3 shows a spring banded compression loaded mounting under no load, FIG. 4 shows the FIG. 3 mounting under load, and FIG. 5 shows comparative load deflection curves.

In the conventional compression loaded mounting, the load is carried by a body or column 1 of a suitable elastomer such as natural or synthetic rubber in load carrying relation between supporting and supported members 2 and 3. Under load, the body bulges as indicated at 4, producing the characteristic load deflection curve 5 in the lower part of FIG. 5. With this mounting, the spring rate is softest at no load and increases with load. For any particular load, for example the load indicated at point W, the total deflection is indicated by point D1 and the spring rate is indicated by the tangent 6 to the load deflection curve. This general shape of curve which is characteristic of compression loaded mountings is objectionable in applications where space is limited because of the relatively large deflection required to reach the normal operating point. This characteristic curve is also objectionable for shock absorption because the energy absorption indicated by the area under the load deflection curve is relatively small.

To improve the operating characteristics for both vibration and shock absorption, the body 1 is encircled by a spring band 7 occupying a substantial portion of the surface of the body. The band can be a metal ring longitudinally split as shown at 8, or it can be any other suitable form of spring band. Instead of one wide band, several narrower bands may be arranged side by side. The spring action of the band may be due wholly to its inherent resilience or to supplementary springs, such as garter spring 8a. The spring 8a may be used alone. The band is preloaded so the abutting ends at the split are closed under contracting force and do not separate until the expansive force on the band exceeds a threshold. The band is essentially rigid until a predetermined expanding force is reached after which it begins to yield. The characteristics of the mounting are conveniently varied by varying the preload. The effect of the band is to limit the area of the body 1 in which bulging can take place under load. By cutting down the bulge area, the resistance to deflection under load is increased (the spring rate is increased) due to the incompressibility of the elastomer. Under load, as shown in FIG. 4, the body now bulges, as indicated at 9, and the split between the ends of the band opens up, as indicated at 10. The characteristic load deflection curve is shown at 11 in FIG. 5, from which it can be seen that initially the mounting is quite stiff and that its stiffness gradually decreases until it reaches a relatively constant value, as indicated in the region 12, after which the spring rate again increases. For the load represented by point W in FIG. 5, the spring rate is essentially identical with the spring rate of the unbanded FIG. 1, 2 mounting, but the static deflection represented by point D2 is less than half the static deflection of the FIG. 1 and 2 mountings. This means that less space is required for the same vibration isolation. Furthermore, the area under the load deflection curve 11 is substantially greater than the area under the load deflection curve 5 so that the energy absorption under shock will be substantially better for the FIG. 3 and 4 mounting.

The effect of the spring band 7 is different from a solid band. With a mounting identical with that shown in FIG. 3 except for the omission of the split 8, the load deflection curve is as shown at 13 in FIG. 5 where it can be seen that at low load the characteristics are substantially the same as the unbanded mounting of FIG. 1 and 2 in that the spring rate is softest at no load and continually increases. The only effect of the solid band is to make all parts of the load deflection curve steeper. The effect of the spring band is to introduce additional stiffness at light load. Until the split 8 begins to open, the band 7 behaves in substantially the same manner as a continuous band as indicated by comparison of the load deflection curves 11 and 13 up to the cross over point 14. Up to this point, both the continuous band and the split or spring band have substantially the same effect in limiting the bulge area. Above the cross over point 14, the mounting becomes softer as indicated by the portion of the curve 11 above the cross over point 14 and the load deflection curve is more like the load deflection curve 5 of an unbanded mounting.

The load deflection curve of the spring banded mounting for the operating range lies between the load deflection curves of the unbanded and rigidly banded mountings and various expedients are available for modifying the characteristics. The initial stiffness is controlled primarily by the width of the band. By preloading the band so that it cannot open up until the preload is exceeded, the point at which the characteristics of the mounting change from stiff to soft can be varied. Lubrication between the band and the body reduces the friction and accordingly reduces the stiffness after the band opens. All of these permit a considerable range of load deflection curves with minor modification in the basic design.

If it should be noticed that the band 7 tends to slip out of place, various expedients are available for preventing this. The body 1 might be provided with an external retaining groove or the band and body can be provided with interfitting anchoring projections and depressions.

It is also possible to modify the characteristics of the mounting further by providing an initial clearance between the band 7 and the body 1. This clearance need not be uniformly distributed between the band and the underlying surface of the body 1. It is sufficient that there be space, uniform or non uniform, between the body and the band into which the rubber can flow or bulge until the space is taken up. With this variation, the load deflection curve would start as in curve 5 with a relatively soft spring rate. As the clearance between the body and band was taken up, the rubber would be confined and the load deflection curve would shift from the soft spring rate of curve 5 to the stiffer spring rate of curve 11. The mounting accordingly could have initial softness (as at the lower end of curve 5) followed by a stiff range (as up to point 14 on curve 11) followed by a soft and then a stiffer range (as at 12 et seq. on curve 11). A representative load deflection curve illustrating these characteristics is shown at 15 in FIG. 5.

What is claimed as new is:

1. A resilient mounting having supporting and supported members and an elastomeric body in load carrying relation between the members and arranged to sustain the load in compression, a spring band encircling the body and resisting bulging of the body under load and thereby modifying the spring rate, said band having abutting parts and resilient means holding the parts in abutting relation under initial tension to provide a positive restraint and a stiff spring rate, said band yielding as the load increases above said initial tension to provide a softer spring rate followed by a stiffer spring rate as the load increases still further above said initial tension.

2. The mounting of claim 1 in which the band is a longitudinally split ring.

3. The mounting of claim 1 in which the band includes a coil spring.

4. A resilient mounting having supporting and supported members and an elastomeric body in load carrying relation between the members and arranged to sustain the load in compression, a spring band encircling the body and resisting bulging of the body under load, said band being a longitudinally split ring with ends abutting and held together under initial tension providing a positive restraint to provide a stiff spring rate under loads insufficient to overcome said initial tension, and said band yielding under loads sufficient to overcome said initial tension to provide a softer spring rate followed by a stiffer spring rate under still heavier loads.

5. The mounting of claim 1 in which there is a clearance between the body and band taken up by initial bulging of the body under load.

6. The mounting of claim 4 in which there is a clearance between the body and band taken up by initial bulging of the body under load.

7. A resilient mounting having supporting and supported members and an elastomeric body in load carrying relation between the members and arranged to sustain the load in compression, a band encircling the body and resisting bulging of the body under load and thereby modifying the spring rate, said band having at least one longitudinal split, and spring means for holding the ends of the split closed with a predetermined force to provide a positive restraint and a stiff spring rate, said band yielding as the load increases above said predetermined force to provide a softer spring rate followed by a stiffer spring rate as the load increases still further above said predetermined force.

8. A resilient mounting having supporting and supported members and an elastomeric body in load carrying relation between the members and arranged to sustain the load in compression, a band encircling the body, said band having a longitudinal split and spring means holding the ends of the split in abutting relation under a predetermined initial force and providing an essentially rigid restraint to bulging of the body until a predetermined compressive load is applied to the body.

9. A rubber column subject to compressive load, a band surrounding said column, a split in said band parallel to the column axis, and spring means holding the ends of the split in abutting relation under a predetermined initial force and providing an essentially rigid restraint to bulging of the column until a predetermined compressive load is applied to the column.

References Cited in the file of this patent

UNITED STATES PATENTS

| | | |
|---|---|---|
| 57,365 | Murphy | Aug. 21, 1866 |
| 107,035 | Gardiner | Sept. 6, 1870 |
| 139,862 | Bridges | June 17, 1873 |
| 2,117,433 | Krebs | May 17, 1938 |
| 2,239,113 | O'Connor | Apr. 22, 1941 |
| 2,570,370 | O'Connor | Oct. 9, 1951 |
| 2,891,785 | Sando et al. | June 23, 1959 |